US012742567B2

(12) United States Patent
Votaw et al.

(10) Patent No.: US 12,742,567 B2
(45) Date of Patent: Sep. 22, 2026

(54) FOLDABLE, BOOT LOADABLE, INSERTABLE AIR DAMPER DEVICE

(71) Applicant: Arzel Zoning Technology, Inc., Cleveland, OH (US)

(72) Inventors: Mark Votaw, North Canton, OH (US); Dennis Laughlin, Chardon, OH (US); Al Zelczer, University Heights, OH (US); Howard Zelczer, Brooklyn, NY (US); Lenny Roth, University Heights, OH (US); Vladimir Sipershteyn, Independence, OH (US); Joseph Ramunni, Wadsworth, OH (US); Bill Molica, Willowick, OH (US)

(73) Assignee: Arzel Zoning Technology, Inc., Cleveland, OH (US)

(*) Notice: Subject to any disclaimer, the term of this patent is extended or adjusted under 35 U.S.C. 154(b) by 18 days.

(21) Appl. No.: 18/661,158

(22) Filed: May 10, 2024

(65) Prior Publication Data

US 2024/0295340 A1 Sep. 5, 2024

Related U.S. Application Data

(63) Continuation of application No. 17/457,995, filed on Dec. 7, 2021, now Pat. No. 12,007,141, which is a (Continued)

(51) Int. Cl.
*F24F 13/10* (2006.01)
*F16K 1/22* (2006.01)
(Continued)

(52) U.S. Cl.
CPC .......... *F24F 13/10* (2013.01); *F16K 27/0232* (2021.08); *F24F 13/02* (2013.01);
(Continued)

(58) Field of Classification Search
CPC ........ F24F 13/10; F24F 13/02; F24F 13/1413; F24F 13/1426; F16K 1/22; F16K 1/223;
(Continued)

(56) References Cited

U.S. PATENT DOCUMENTS 2,315,775 A 4/1943 D'Arcey
2,608,203 A 8/1952 Butler
(Continued)

FOREIGN PATENT DOCUMENTS

CN 203052773 U 7/2013
EP 2541159 A1 * 1/2013 .............. F24F 13/14
(Continued)

OTHER PUBLICATIONS

Damper for prevent a head wind; Sim Chong Sub KR 2011 0017709A; (Year: 2011).*
(Continued)

*Primary Examiner* — Michael G Hoang
*Assistant Examiner* — Frances F. Hamilton
(74) *Attorney, Agent, or Firm* — Vorys, Sater, Seymour and Pease LLP; Rex W. Miller, II

(57) ABSTRACT

A boot loadable air damper includes an actuator, a support base supporting the actuator, and a foldable sheet member attached to the support base for securing the damper device to an inner surface of the ductwork. The air damper device also includes a foldable damper blade that is foldable at first and second tensioned hinges which bias it towards an unfolded state and, when fully unfolded into the unfolded state, at least one stop member acting against the first and second tensioned hinges restricts further unfolding of the foldable damper blade.

20 Claims, 10 Drawing Sheets

Related U.S. Application Data continuation of application No. 17/108,477, filed on Dec. 1, 2020, now abandoned, which is a continuation of application No. 14/618,249, filed on Feb. 10, 2015, now abandoned, which is a continuation of application No. 12/913,261, filed on Oct. 27, 2010, now Pat. No. 8,951,103.

(51) Int. Cl.
*F16K 27/02* (2006.01)
*F24F 13/02* (2006.01)
*F24F 13/14* (2006.01)

(52) U.S. Cl.
CPC ............. *F16K 1/22* (2013.01); *F24F 13/1426* (2013.01); *F24F 2013/1466* (2013.01); *F24F 2221/36* (2013.01)

(58) Field of Classification Search
CPC . F16K 27/0218; F16K 27/0232; F16K 15/033
USPC ........................................................ 454/333
See application file for complete search history.

(56) References Cited

U.S. PATENT DOCUMENTS 2,676,604 A 4/1954 Senna
2,733,889 A 2/1956 Mattingly
2,844,086 A 7/1958 Birdsall
2,890,716 A 6/1959 Werder
2,902,254 A 9/1959 Conway et al.
3,007,488 A * 11/1961 Wheeler, Jr. .......... F16K 15/033 137/454.2
3,070,345 A 12/1962 Knecht
3,070,346 A 12/1962 Kennedy
3,074,427 A * 1/1963 Wheeler, Jr. .......... F16K 15/033 137/454.2
3,369,666 A 2/1968 Herbert et al.
3,420,448 A 1/1969 Snow
3,512,752 A 5/1970 Johannes et al.
3,580,238 A 5/1971 Diehl
3,605,797 A * 9/1971 Dieckmann et al. ........................ F24F 13/0263 454/305
3,771,759 A 11/1973 Pauquette
3,791,279 A 2/1974 Holt et al.
3,799,434 A 3/1974 Heidacker
RE28,492 E 7/1975 Hedrick et al.
3,921,900 A * 11/1975 Cole ....................... F16K 1/223 236/93 R
3,976,245 A * 8/1976 Cole .................... G05D 23/123 251/251
3,993,096 A 11/1976 Wilson
4,147,298 A 4/1979 Leemhuis
4,189,092 A 2/1980 Maxson et al.
4,213,477 A 7/1980 Velasquez
4,241,748 A 12/1980 McCabe
4,241,897 A 12/1980 Maezawa
4,249,856 A 2/1981 Aksola
4,270,559 A 6/1981 Wallberg
4,301,831 A 11/1981 Lord
4,372,485 A * 2/1983 McCabe ................. F23L 13/02 236/1 G
4,418,719 A 12/1983 Downs, Jr. et al.
4,452,391 A * 6/1984 Chow ................. F24F 13/1426 251/298
4,458,487 A 7/1984 Kojima et al.
4,482,291 A 11/1984 Chakrawarti et al.
4,545,524 A 10/1985 Zelczer
4,582,249 A 4/1986 Nelson et al.
4,628,954 A 12/1986 Dayus
4,691,689 A 9/1987 Shepherd et al.
4,699,121 A 10/1987 Apollonia
4,702,412 A 10/1987 Zelczer et al.
4,815,362 A 3/1989 Ishizuka et al.
4,949,625 A 8/1990 Miklos
5,106,052 A 4/1992 Datta et al.
5,167,574 A 12/1992 Ikeda et al.
5,169,121 A 12/1992 Blanco et al.
5,234,374 A * 8/1993 Hyzyk .................... F24F 13/10 454/258
5,363,025 A 11/1994 Colling
5,458,148 A 10/1995 Alex et al.
5,531,248 A 7/1996 Pearson et al.
5,921,277 A 7/1999 Bernal
5,934,994 A 8/1999 Wylie et al.
6,036,162 A 3/2000 Hayashi
6,102,927 A 8/2000 Wright et al.
6,105,927 A * 8/2000 Zelczer ................. F16K 31/165 251/308
6,676,508 B1 * 1/2004 Graham .............. F24F 13/1426 454/270
6,817,378 B2 11/2004 Zelczer
7,013,183 B1 3/2006 Solomon
7,410,416 B2 8/2008 Fettkether
7,543,759 B2 6/2009 George
7,566,264 B2 7/2009 Votaw et al.
7,596,962 B2 10/2009 Karamanos
8,528,183 B2 9/2013 Michaud et al.
8,568,211 B2 10/2013 Miller
8,936,203 B2 1/2015 Jackson
8,951,103 B2 2/2015 Votaw et al.
9,016,320 B1 4/2015 Kelley
2002/0170143 A1 11/2002 Vitry
2002/0175307 A1 * 11/2002 McCabe ................ A62C 2/241 251/302
2002/0179159 A1 * 12/2002 Zelczer ................... F16K 1/221 137/601.09
2003/0052294 A1 * 3/2003 Moore .................... F16K 1/223 251/301
2006/0057954 A1 * 3/2006 Hrebeniuk .............. F24F 13/02 454/256
2007/0044787 A1 * 3/2007 Brice ...................... F23L 13/02 126/91 A
2008/0014859 A1 * 1/2008 Edmisten ............ F24F 13/1486 454/290
2008/0116288 A1 * 5/2008 Takach .................... F24F 13/14 29/469
2009/0181611 A1 7/2009 Hollender et al.
2010/0105312 A1 * 4/2010 Bamberger ......... F24F 13/1426 29/426.1
2010/0223773 A1 * 9/2010 Florian .................. A62C 2/242 29/283
2011/0105012 A1 5/2011 Niederhauser
2012/0108159 A1 * 5/2012 Votaw ................. F24F 13/1413 454/333
2018/0128388 A1 * 5/2018 Ferus .................... F16K 15/036
2019/0376614 A1 12/2019 Carlson et al.
2020/0263797 A1 * 8/2020 May ...................... F16K 15/036
2021/0293340 A1 * 9/2021 Allen .................... F16K 15/038
2023/0400111 A1 12/2023 Xie et al.

FOREIGN PATENT DOCUMENTS

KR 100347814 A 8/1996
KR 19990041049 U * 12/1999 ........... F16K 15/035
KR 100347814 B1 * 11/2002 .............. F24F 11/74
KR 20090062807 A 6/2009
WO 2008019519 A1 2/2008

OTHER PUBLICATIONS

Aprilaire Specification Sheet, Model 6706—6" Retrofit Zoned Comfort Damper, Model 8028—Damper Power Distribution Panel, 2005, 2 pages, RP Research Products Corporation, Madison, WI.
Freshex Fresh Air Ventilation, Make-Up Air Controls, 2003, 1 page, Trolex Corporation.
The Zone Control Experts, Introducing the Retro Damper, Feb. 21, 2005, 2 pages, Jackson Systems, LLC, Indianapolis, IN.
The Zone Control Experts, Zone Control Products, Sep. 14, 2005,

(56) References Cited

OTHER PUBLICATIONS 15 pages, Jackson Systems, Indiapolis, IN, http://www.jacksonsystems.com/index.php?module=zone_zone_control_products/.

Retrofit Round Damper, 2006, 7 pages, Honeywell International Inc., Golden Valley, MN 55422.

Air Control Dampers by Trolex Corp., self-contained manual and automatic air control dampers for the . . . , Sep. 16, 2005, 13 pages, http://trolexcorp.com/.

Zone-A-Trol Controlling Temperature Room by Room, Condensed Catalog anbd List Price Index #102, Feb. 1, 2005, 4 pages, Zone-A-Trol, Elmwood Park, NJ 07407-3204.

Zone-A-Trol Controlling Temperature Room by Room, Products, Sep. 14, 2005, 2 pages, http://www.zoneatrol.com/products.html.

ZoneFirst, Automatic Opposed Blade Dampers, Models AOBD, AOBM and IOBD, 2003, 2 pages, ZoneFirst, Elmwood Park, NJ 07407-3204.

ZoneFirst, Modulating Round Damper, Model RDM, 2003, 1 page, ZoneFirst, Elmwood Park, NJ 07407-3204.

ZoneFirst, Round Damper Spring Return, Model RDS, 2003, 2 pages, ZoneFirst, Elmwood Park, NJ 07407-3204.

ZoneFirst, Static Pressure Regulating Dampers, Model SPRD, 2003, 1 page, ZoneFirst, Elmwood Park, NJ 07407-3204.

ZoneFirst, Zone Dampers, Model ZD, 2003, 1 page, ZoneFirst, Elmwood Park, NJ 07407-3204.

BalancePro: Bringing Balance to Forced-Air Systems, http://www.zrzelzoning,com/products/balancepro, Jan. 15, 2011.

EzySlide Dampers: The Most Simple, Flexible & Reliable Dampers, Period, http://www.arzelzoning.com/products/ezyslide, Jan. 5, 2011.

Regidamper: Easy to Install Register Boot Dampers, http://www.arzelzoning.com/products/regidamper, Jan. 5, 2011.

Insertadamper: Trunk Dampering Made Simple, http://www.arzelzoning.com/products/insertadamper, Jul. 20, 2010.

Safford, A. G., “Car Ventilator,” U.S. Pat. No. 95,938, issued Oct. 12, 1869, 2 pages.

* cited by examiner

FOLDABLE, BOOT LOADABLE, INSERTABLE AIR DAMPER DEVICE

REFERENCE TO RELATED APPLICATIONS

This application is a continuation of U.S. application Ser. No. 17/457,995 filed Dec. 7, 2021, which is a continuation of U.S. application Ser. No. 17/108,477 filed Dec. 1, 2020, which is a continuation of U.S. application Ser. No. 14/618,249 filed Feb. 10, 2015, which is a continuation of U.S. application Ser. No. 12/913,261 filed Oct. 27, 2010, the disclosures of which are hereby incorporated herein by reference in their entirety.

TECHNICAL FIELD

Certain embodiments of the present invention relate to air dampers. More particularly, certain embodiments of the present invention relate to air dampers that are installed into air ducts.

BACKGROUND

Today, airflow control systems are used in retrofit applications in ductwork, mainly to control a room or area's temperature and/or climate. An example of a type of control system that is utilized is a damper, which may generally be a valve or plate that stops or regulates the flow of air inside a duct, chimney, variable air volume box, air handler, or other air handling equipment. A damper can be used to shut off the airflow into various rooms or to regulate its temperature and climate. Various damper apparatuses utilize manual and/or automatic functions to adjust the airflow into the designated room or area, and thereby control its temperature qualities. However, when applying airflow control techniques to retrofit applications, reconfiguring the ductwork is very expensive because of the time and material required to modify such ductwork and the inability to access ductwork between floors or above finished ceilings, for example. Examples of dampers, when there is enough access room within the ductwork, include installation of either trunk dampers in the main trunks or branch dampers near the main truck. However, there are many instances where portions of the ductwork are inaccessible to these types of dampers, and other methods and devices are necessary. Louvered dampers, for example, may not provide a complete shutoff of the airflow.

Other considerations that may be taken into account are issues of noise level and damper size. If a damper is too large, then the damper is unusable because it is not able to fit through an opening of the ductwork. For example, if the cross section of the damper is too large, it may not be installed through a standard register boot. Additionally, damper and blade positioning are important because as the blades close, they can produce objectionable whistling due to accelerated air that moves through small spaces between the edges. Also, register dampers and register louvers tend to create rattling noises. Therefore, a need exists for a damper that can easily access existing or new ductwork and may be adjustable.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY OF THE INVENTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with various embodiments, a boot loadable air damper device for controlling the flow of air through ductwork includes an actuator having a retractable member and a pivoting member, wherein said pivoting member is operatively connected to said retractable member of said actuator. The air damper device also includes at least one support base supporting said actuator and said pivoting member with respect to each other, and a foldable sheet member attached to the support base, the foldable sheet member is configured to secure the damper device to an inner surface of the ductwork. The air damper device also includes a foldable damper blade attached to said pivoting member, the foldable damper blade comprising a rigid central blade member, a first side blade member hingedly attached to a first side of the central blade member at a first tensioned hinge, and a second side blade member hingedly attached to a second side of the central blade member at a second tensioned hinge, the foldable damper blade being foldable at the first and second tensioned hinges which bias the first side blade member and the second side blade member towards an unfolded state and, when fully unfolded into the unfolded state, at least one stop member acting against the first and second tensioned hinges restricts further unfolding of the foldable damper blade relative to the central blade member.

In accordance with another embodiment, a method for inserting a boot loadable air damper device into a ductwork includes providing a boot loadable air damper device comprising an actuator having a retractable member and a pivoting member, wherein said pivoting member is operatively connected to said retractable member of said actuator. The air damper device also includes at least one support base, supporting said actuator and said pivoting member with respect to each other, a foldable sheet member attached to the support base and adapted to secure the damper device to the inner surface of a ductwork, and a foldable damper blade attached to said pivoting member, the foldable damper blade comprising a rigid central blade member, a first side blade member hingedly attached to a first side of the central blade member at a first tensioned hinge, and a second side blade member hingedly attached to a second side of the central blade member at a second tensioned hinge, the foldable damper blade being foldable at the first and second tensioned hinges which bias the first side blade member and the second side blade member towards an unfolded state and, when fully unfolded into the unfolded state, at least one stop member acting against the first and second tensioned hinges restricts further unfolding of the foldable damper blade relative to the central blade member. The method also includes folding at least first side blade member and the second side blade member of the foldable damper blade together, inserting the air damper device through a register boot into a ductwork, and releasing at least the foldable damper blade.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
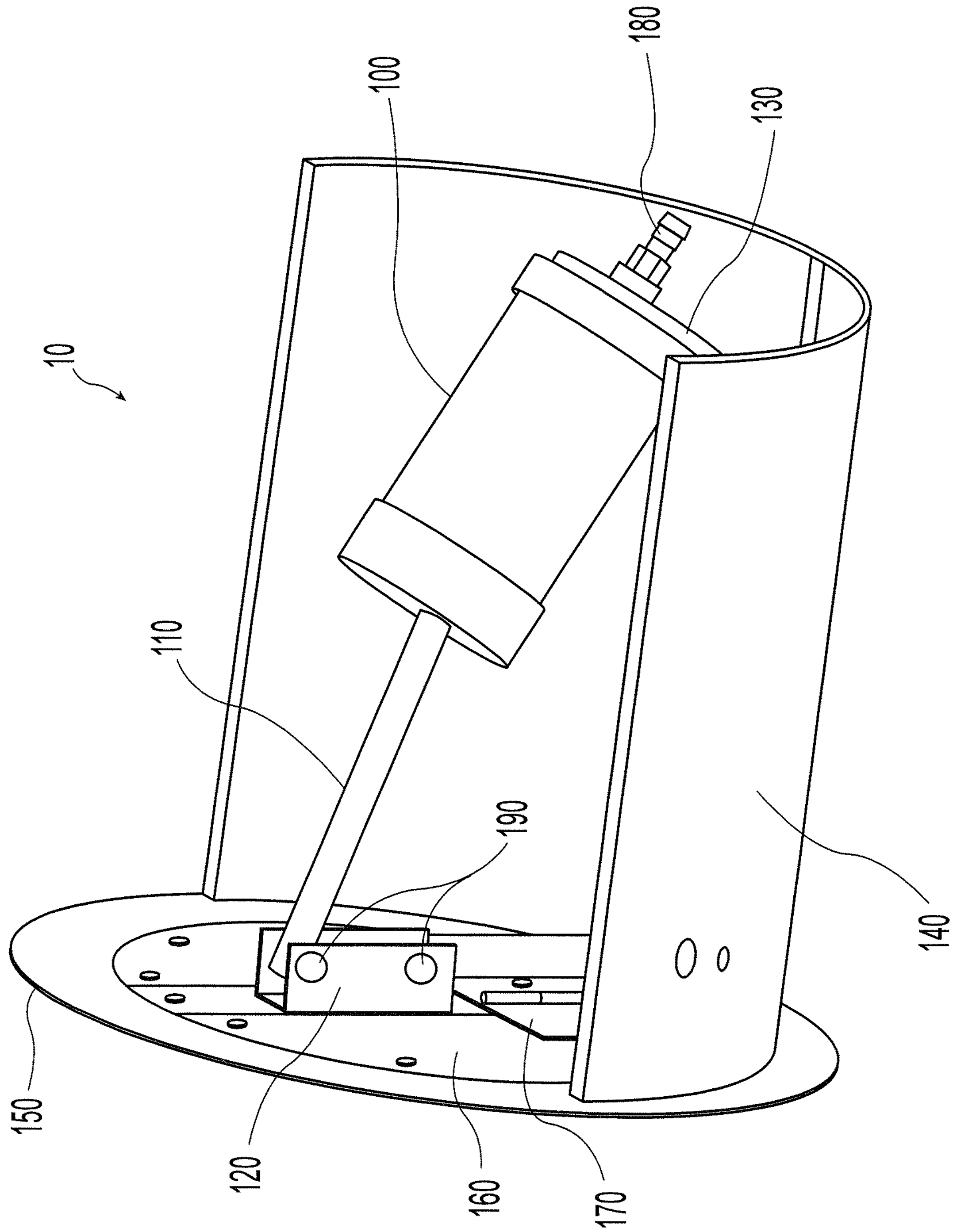
FIG. 1 illustrates a perspective view of an embodiment of an air damper device of the present invention with the damper blade unfolded and in a closed position.

FIG. 1 illustrates a perspective view of an embodiment of an air damper device 10 of the present invention with the damper blade unfolded and in a closed position. In accordance with an embodiment of the present invention, the damper device 10 is intended to be installed through a register boot of a ductwork (see FIG. 9) and is further intended to operatively interface to an electronic controller via an air pump device. The damper device 10 includes an actuator 100 having a retractable member 110, and a pivoting member 120 operatively connected to the retractable member 110 of the actuator 100. The damper device 10 also includes a support base 130 supporting the actuator 100 and the pivoting member 120 with respect to one another. The damper device 10 further includes a foldable damper blade 160 attached to the pivoting member 120, and a tensioned hinge member 170 operatively connected to the foldable damper blade 160. The foldable damper blade 160 is intended to be folded by a user's hand, by squeezing and keeping the blade 160 in a folded position in preparation for installation. When released by the user, the damper blade 160 unfolds as is described later herein.

The pivoting member 120 may be constructed of a plastic or metallic material that may be strong enough to withstand pressures or external forces that may be exerted on the damper device 10. Moreover, the pivoting member 120 may include pivoting pins 190 that allow the pivoting member 120 to be connected to the retractable member 110 and the support base 130. FIG. 1 illustrates two pivoting pins 190, however, one pivoting pin or more than two pivoting pins may be envisioned and constructed in a manner that facilitates the pivoting action of the pivoting member 120. The pivoting pins 190 may provide a smooth "self-lubricating" hinge that limits the amount of foreign material build-up. An example of such a pivoting pin may be a nylon pivoting pin, however, other materials may also be used such as plastics, metals, polymers, or any other material that may be used to create a pivoting pin that may be known to one of ordinary skill in the art.

With continued reference to FIG. 1, the support base 130 supports the actuator 100 and the pivoting member 120 with respect to one another. The support base 130 may be constructed from a single, monolithic unit, or the support base 130 may be constructed of multiple members that may add additional stability, flexibility, and/or positioning. The support base 130 may be made of a rigid material such as hard plastics, metals, or polymers. The damper device 10 may further include a foldable sheet member 140 that may be attached to the support base 130, for example. The foldable sheet member 140 may be attached to the support base 130 by staples, screws, nails, fasteners, wire, or any other method of attachment known to one of ordinary skill in the art. The foldable sheet member 140 may be foldable to allow easier access into particularly narrow ductwork. The foldable sheet member 140 may also fasten the damper device 10 to the ductwork. For example, the foldable sheet member 140 may be made of a rubber-type substance that may have high frictional properties. The high frictional properties will grip the walls of the ductwork, and in turn, "fasten" the damper device 10 to the walls of the ductwork. The foldable sheet member 140 may also be made of a magnetic material that may allow the damper device 10 to "fasten" onto the walls of the ductwork. The foldable sheet member 140 may also be made of materials known to one of ordinary skill in the art that allows the foldable sheet member 140 to secure itself onto the ductwork.

Figure 2:
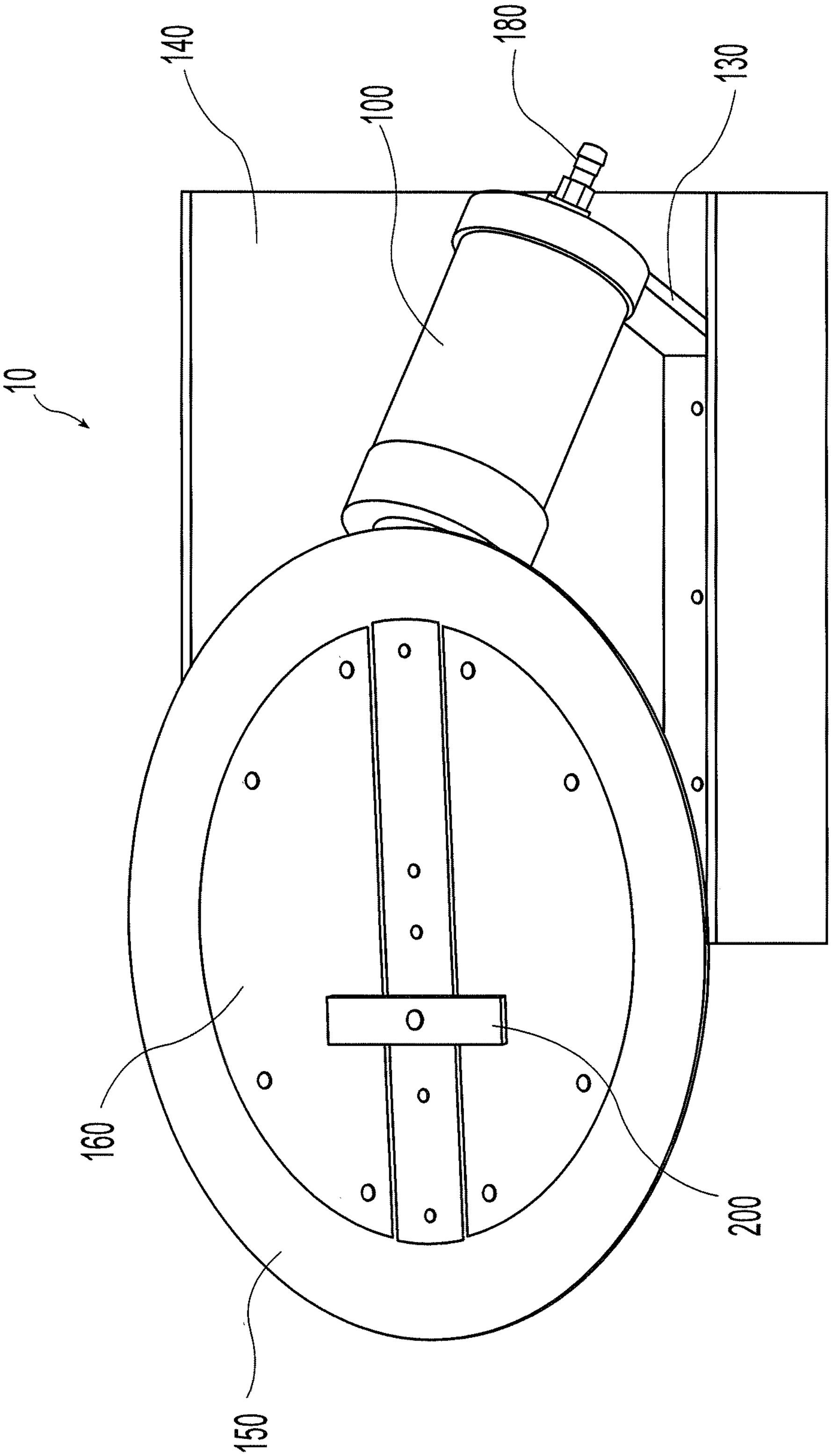
FIG. 2 illustrates a perspective view of the damper device of FIG. 1 with the damper blade unfolded and in an open position.

With reference to FIGS. 1 and 2, wherein FIG. 2 illustrates a perspective view of the damper device of FIG. 1 with the damper blade unfolded and in an open position, the foldable damper blade 160 may be in the shape of a circle or an ellipse, as shown in FIG. 1. However, the foldable damper blade 160 may also be a square, a rectangle, or an oblong shape that fits a ductwork passage and obstructs or reduces the flow of air through the ductwork. The foldable damper blade 160 may also be constructed from a single, monolithic unit or from multiple pieces. In an embodiment of the present invention, the foldable damper blade 160 may be made from a single, monolithic unit, then the foldable damper blade 160 may have lines, perforations, slits, path, or any other section that allows the foldable damper blade 160 to bend, so that the foldable damper blade 160 may fold, for example, perforation O shown in FIG. 9. In another embodiment of the present invention, the foldable damper blade 160 may be made from multiple members, wherein the multiple members are attached to one another to form the foldable damper blade 160, as shown in FIG. 2. The foldable damper blade 160 may be made of a hard material such as a hard plastic, metal, polymer, or any other hard material known to one of ordinary skill in the art.

Additionally, the foldable damper blade 160 may further include a sealing member 150 (e.g., a gasket), which may be a flexible material, such as rubber, that encompasses the periphery of the foldable damper blade 160. The sealing member 150 may be in the same shape as the foldable damper blade 160, but may be larger than the foldable damper blade 160, as shown in FIG. 2. This allows the sealing member 150 to come into contact with the walls of the ductwork before the foldable damper blade 160 comes into contact. The foldable damper blade 160 may be a hard material and may cause a "rattling" noise if it were to come into contact with the ductwork since moving air causes vibrations. The sealing member 150 may be a flexible material that may not rattle against the ductwork and that may conform to the ductwork in order to form a more "air tight" seal. Moreover, the foldable damper blade 160 may be attached to the sealing member 150 by tape, glue, rivets, screws, nails, staples, or any other method of attachment known to one of ordinary skill in the art. This embodiment of the present invention may allow the foldable damper blade 160 to be placed upon and attached to the sealing member 150, which may also allow a multiple piece, foldable damper blade to retain a desired shape and retain foldable capabilities.

Figure 4:
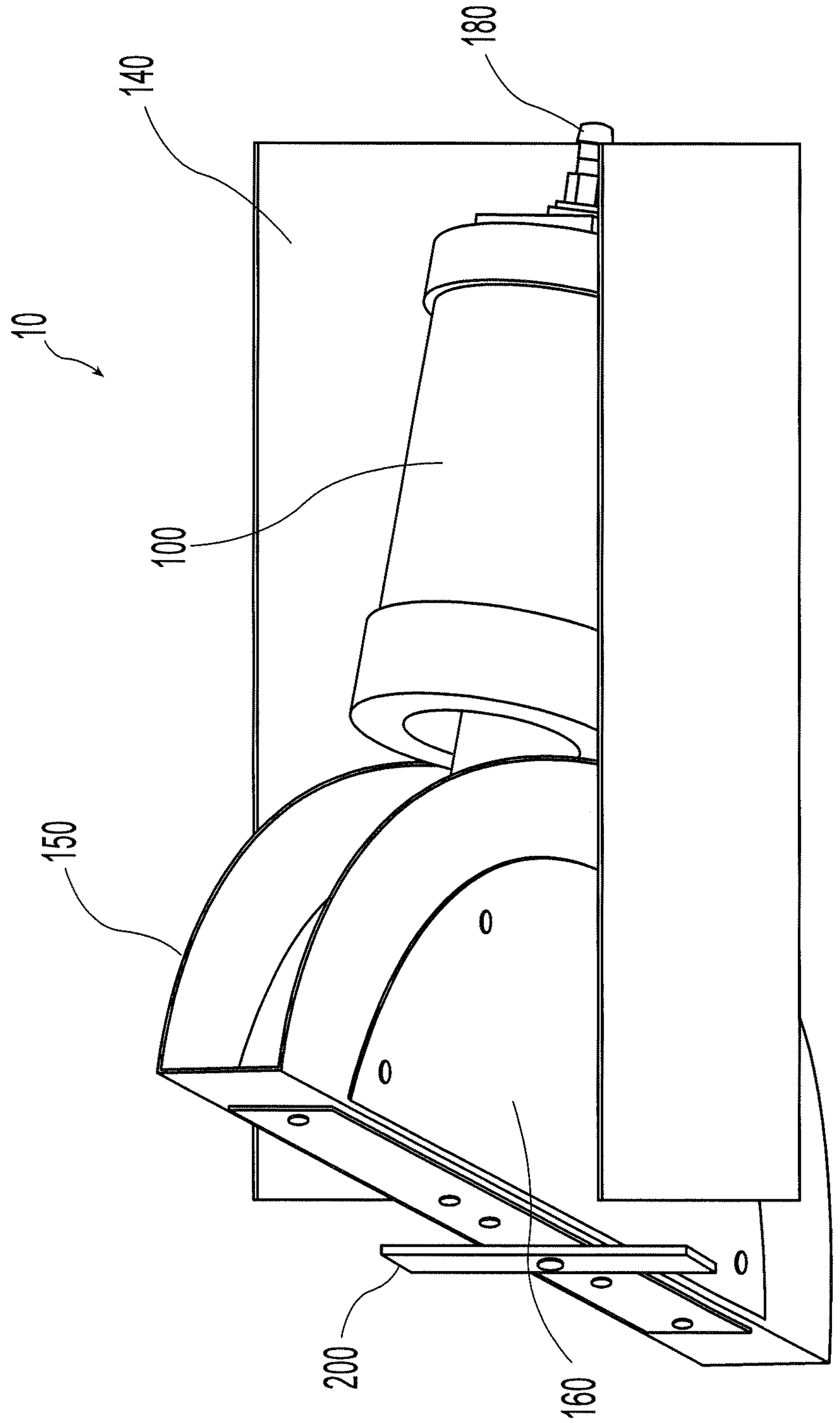
FIG. 4 illustrates a perspective view of the damper device of FIG. 1 with the damper blade completely folded.

With continued reference to FIG. 1, only one hinged tension member is shown and the tensioned hinge member 170 is shown on the side of the foldable damper blade 160 facing the actuator 100. However, various embodiments of the present invention may include more than one hinged tension members where the tensioned hinge member 170 is on the side of the foldable damper blade 160, facing away from the actuator 100. An example of an embodiment of the present invention may include two hinged tension members on either or both sides of the foldable damper blade 160. Larger, heavier foldable damper blades 160 may require larger or more tensioned hinge members 170 to efficiently "fold" and "unfold" the foldable damper blade 160. As the foldable damper blade 160 is folded or retracted, as shown in FIG. 4, the tension force created by the tensioned hinge member 170 increases, thereby creating a potential of stored energy. This potential of stored energy may be stored in a spring or any other component that may store energy known to one of ordinary skill in the art. When the foldable damper blade 160 is released, the tensioned hinge member 170 forces the foldable damper blade 160 to return to an "unfolded state," as shown in FIG. 1, for example.

With continued reference to FIG. 2, the damper device 10 may further include a stop member 200 that may be attached to the foldable damper blade 160 by a fastener such as a rivet, nail, staple, glue, tape, screw, or any other fastener known to one of ordinary skill in the art. The stop member 200 may be made of a rigid material such as a hard plastic, metal, polymer, or combination thereof. The rigid material of the stop member 200 may be strong enough to withstand the force created by the tensioned hinge member 170 so that the stop member 200 does not bend or change its shape. The stop member 200 restricts the motion or to what extent the foldable damper blade 160 may "unfold." As the tensioned hinge member 170 exerts a force on the foldable damper blade 160, the stop member 200 exerts an opposing force that restricts how far the foldable damper blade 160 may extend. Once the foldable damper blade 160 has extended to its maximum "unfolded" position, the foldable damper blade 160 may be in a position to restrict air flow in the duct work. Moreover, FIG. 2 shows the stop member 200 as being rectangular in shape, however, the shape of the stop member 200 may also be a circle, square, irregular shape, or any other shape known to one of ordinary skill in the art that may restrict the foldable damper blade's 160 movement.

Figure 5:
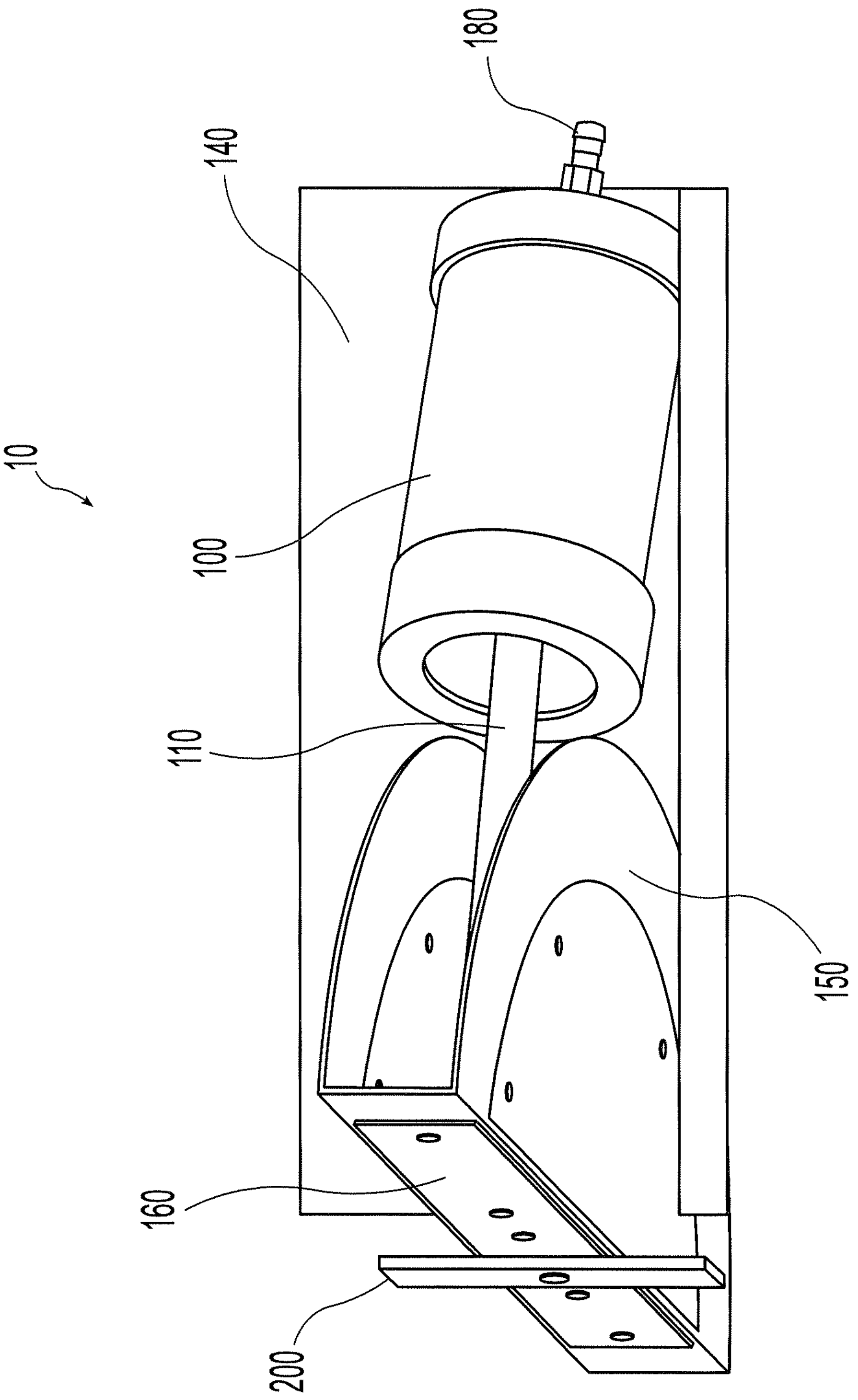
FIG. 5 illustrates a top perspective view of the damper device of FIG. 4 with the damper blade completely folded.
Figure 6:
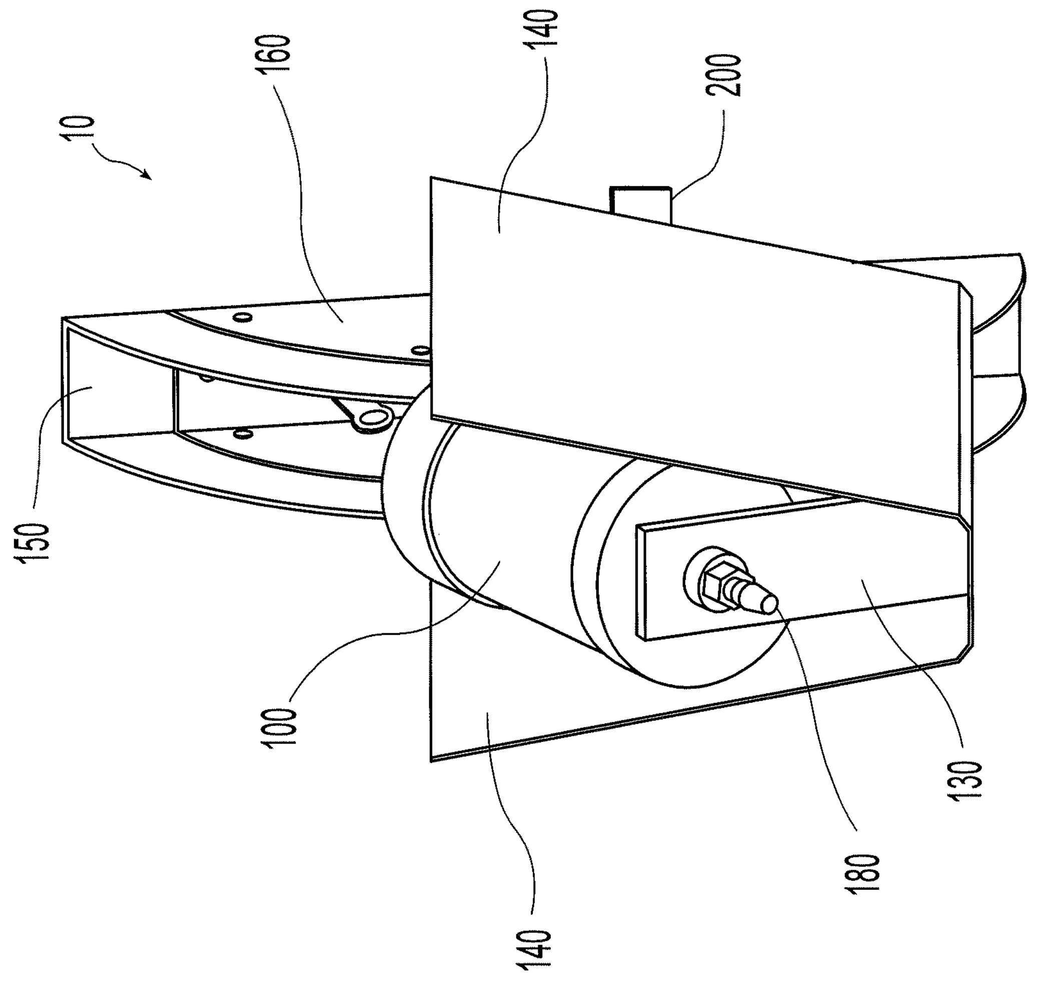
FIG. 6 illustrates a rear perspective view of the damper device of FIG. 1 with the damper blade completely folded.
Figure 7:
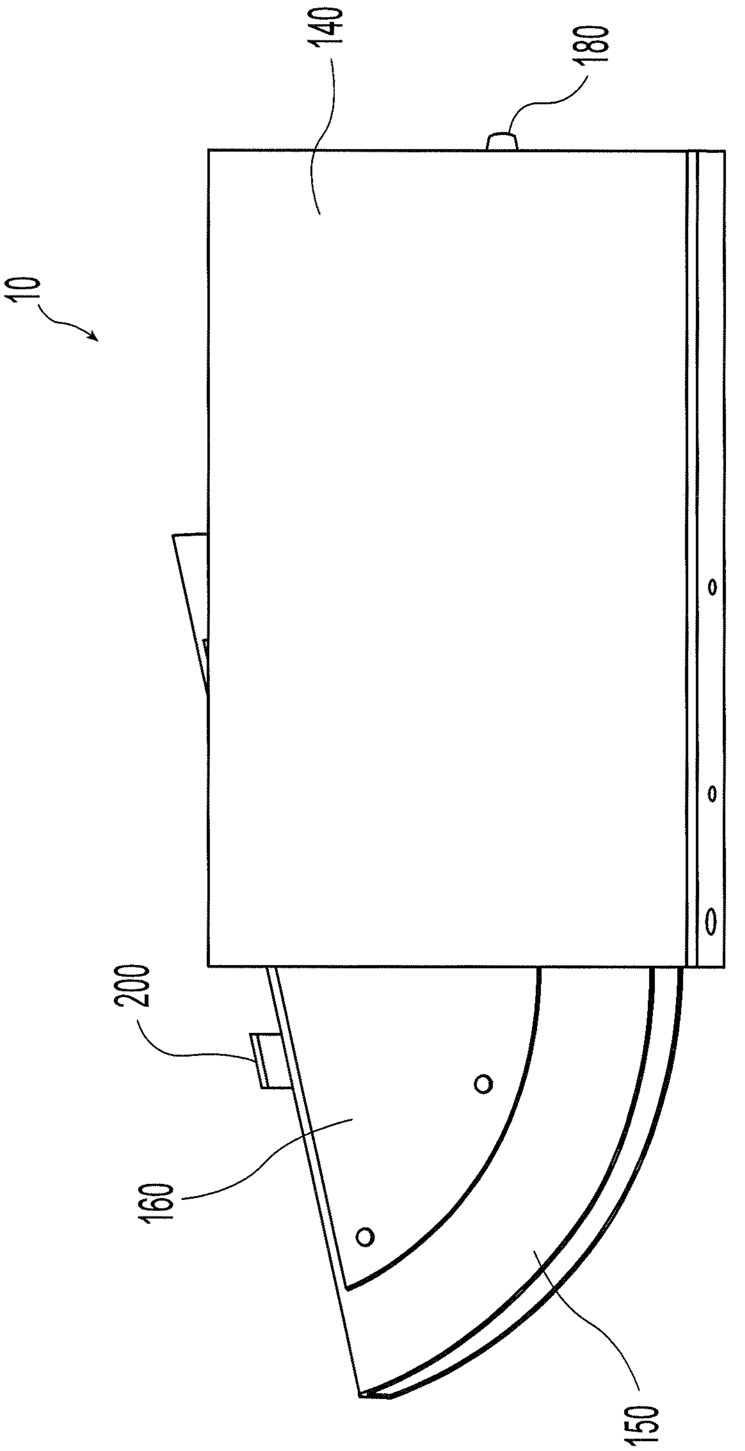
FIG. 7 illustrates a side perspective view of the damper device of FIG. 1 with the damper blade completely folded.

With reference to FIGS. 3-7, FIG. 3 illustrates a perspective view of the damper device 10 of FIG. 1 with the damper blade 160 partially folded. FIG. 4 illustrates a perspective view of the damper device 10 of FIG. 1 with the damper blade 160 completely folded. FIG. 5 illustrates a top perspective view of the damper device 10 of FIG. 4 with the damper blade 160 completely folded. FIG. 6 illustrates a rear perspective view of the damper device 10 of FIG. 1 with the damper blade 160 completely folded. FIG. 7 illustrates a side perspective view of the damper device 10 of FIG. 1 with the damper blade 160 completely folded.

Figure 8:
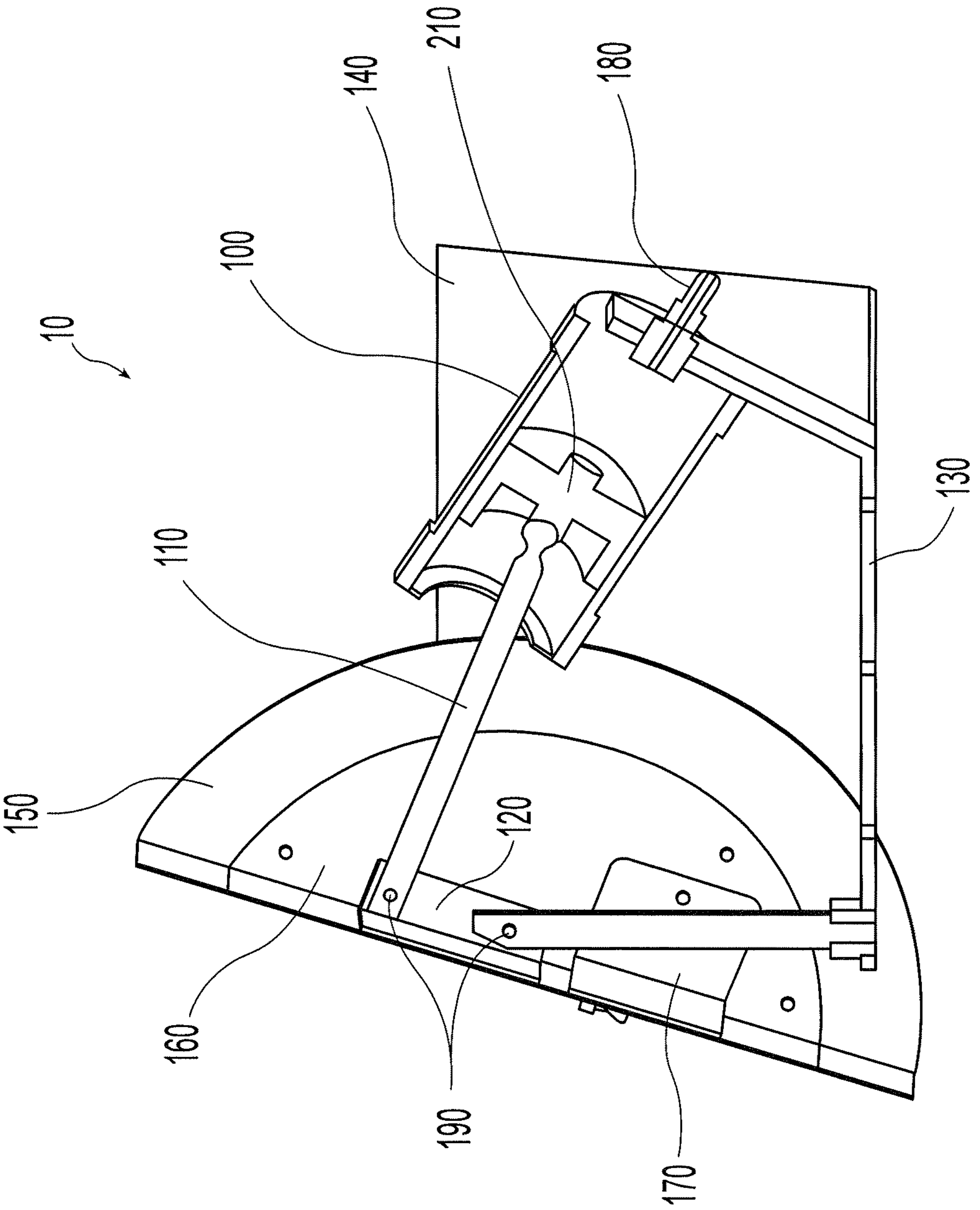
FIG. 8 illustrates a side, cross-sectional view of the damper device of FIG. 1 with the damper blade completely folded.

FIG. 8 illustrates a side, cross-sectional view of the damper device 10 of FIG. 1 with the damper blade 160 completely folded. The actuator 100 also includes an internal actuator member 210 attached to one end of the retractable member 110. As the internal actuator member 210 moves from one end of the actuator 100 to the other end, the internal actuator member 210, in turn, moves the retractable member 110 from a first position to a second position. This motion gives the retractable member 110 its ability to retract and to move back and forth. The actuator 100 may further include an adaptor 180 that may facilitate the actuator's 100 ability to actuate the internal actuator member 210. For example, in an embodiment of the present invention, the actuator 100 may be an air pressurized actuator, wherein the adapter 180 facilitates the passage of air into the actuator 100 in order to become pressurized. The supply of air may come from an air pump or air supply, not shown in the figures, which is controlled by an electronic controller, for example. In another embodiment of the present invention, the actuator 100 may be driven by electro/mechanical methods, such as a motor, wherein the adapter 180 may accept electrical lines to power the actuator 100 from, for example, an electronic controller. Additionally, in the embodiment where the actuator 100 is an electro/mechanical actuator, its power source may also include a battery or an external power supply. The actuator 100 may also be constructed from a material that is strong enough to withstand constant change in pressure or friction caused by internal parts. Some examples of such materials may include hard plastics, metals, polymers, and any other material known to one of ordinary skill in the art.

Figure 3:
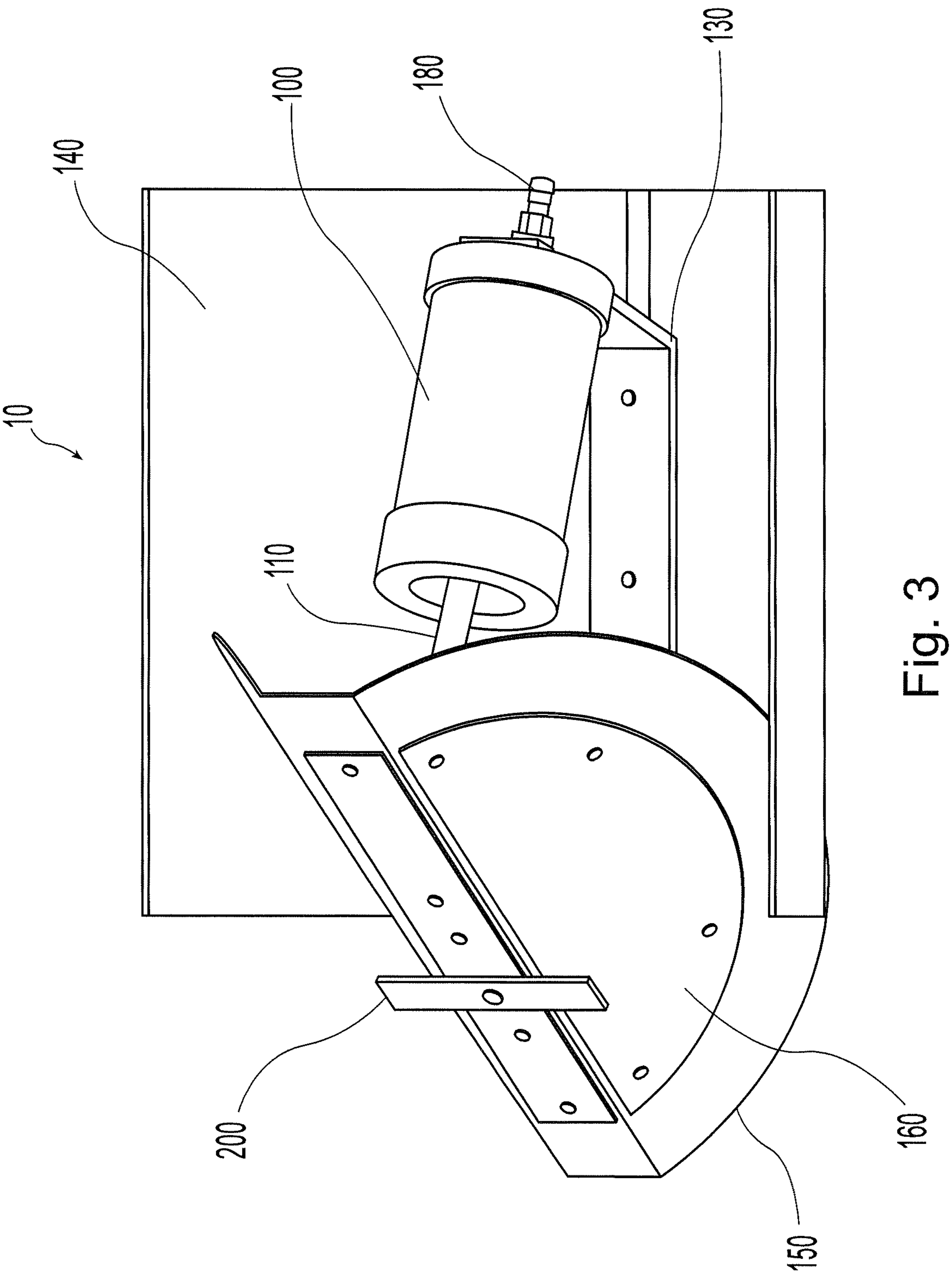
FIG. 3 illustrates a perspective view of the damper device of FIG. 1 with the damper blade partially folded.
Figure 9:
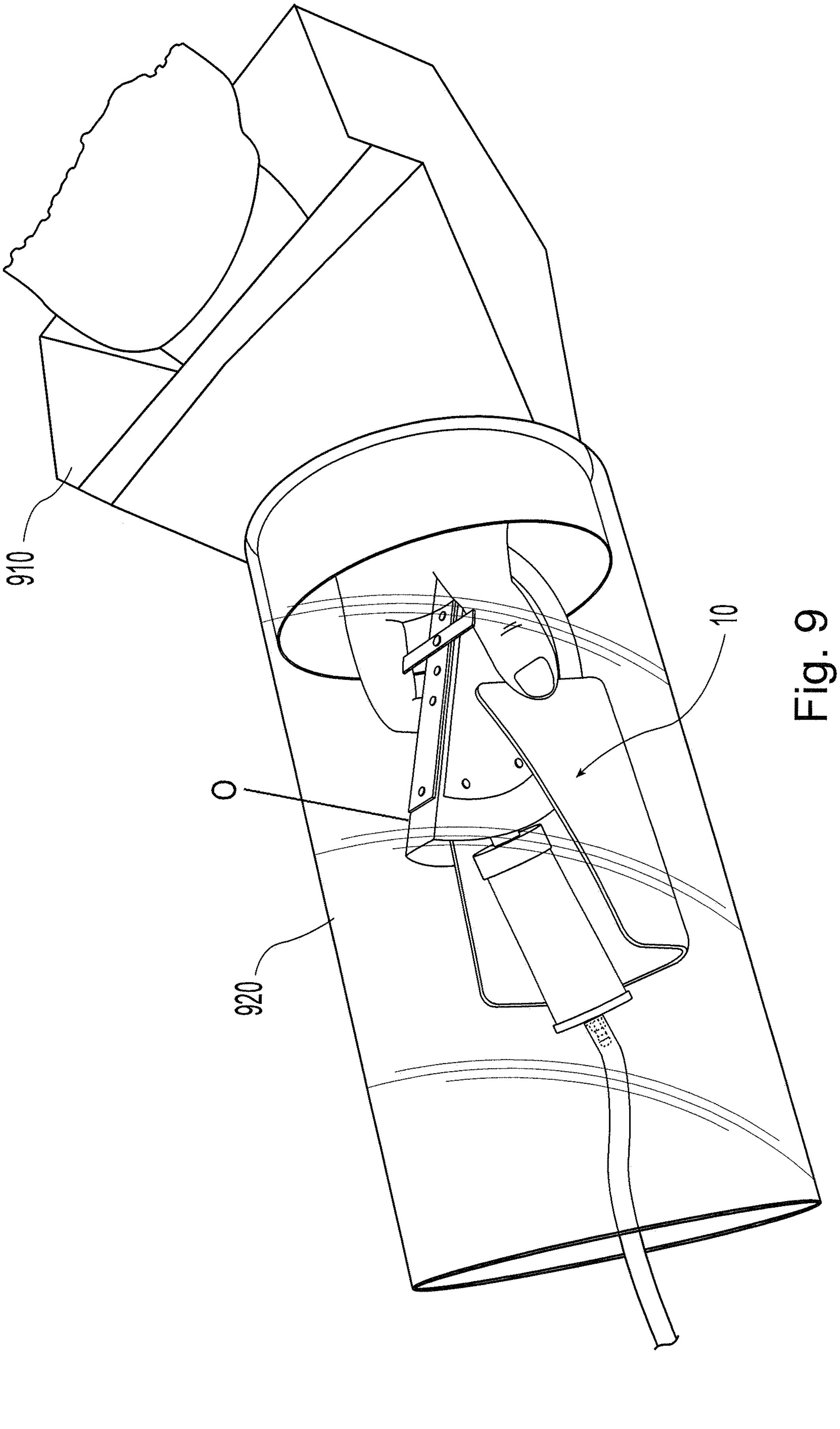
FIG. 9 illustrates the folded damper device of FIGS. 4-8 being inserted through a register boot and into a ductwork, in accordance with an embodiment of the present invention.
Figure 10:
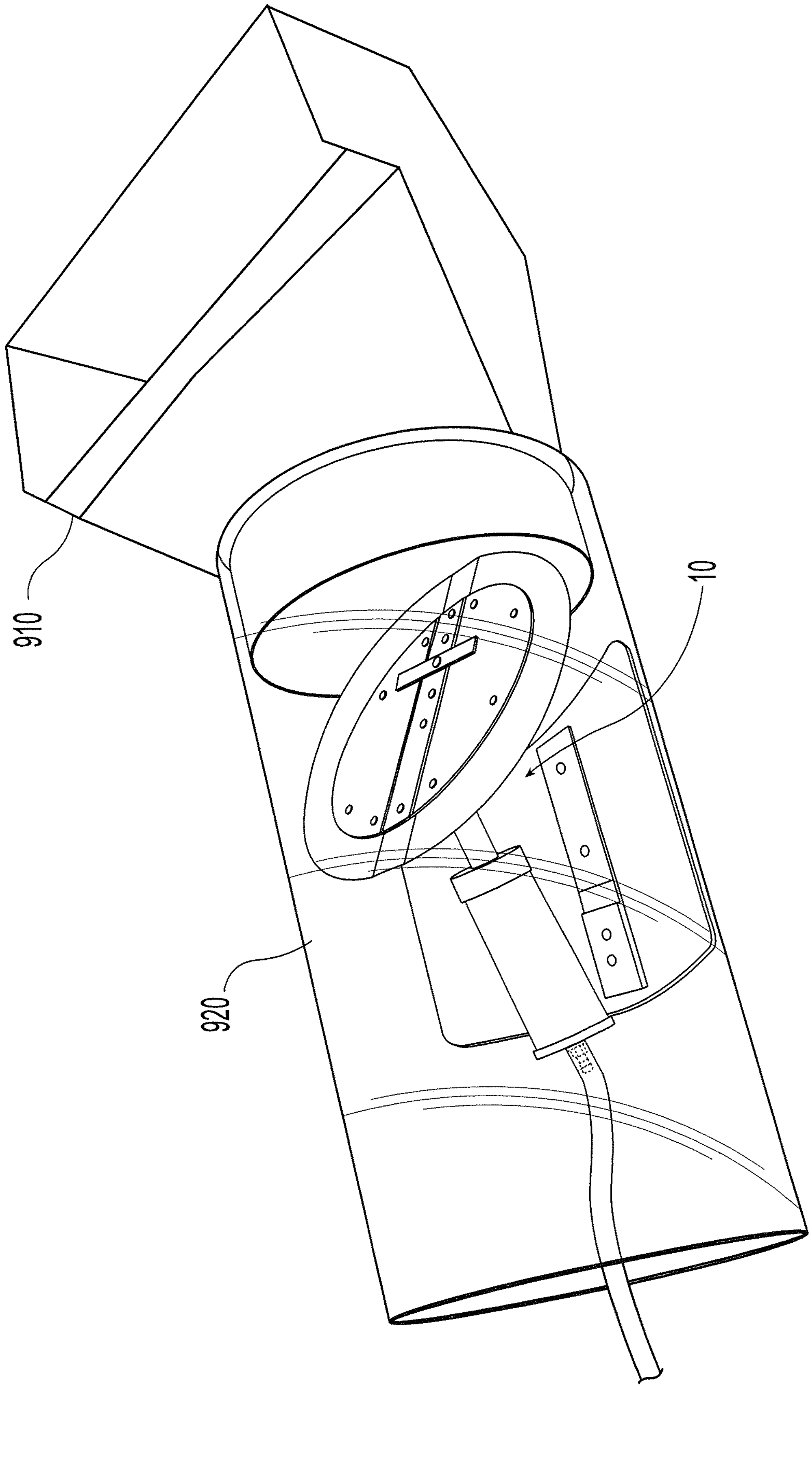
FIG. 10 illustrates the inserted damper of FIG. 9 installed and unfolded within a ductwork.

With continued reference to FIGS. 4-6, a user may "fold" the foldable damper blade 160 and the foldable sheet member 140 to compact the damper device 10. Once the user has "compacted" the damper device 10 by folding, the user may then attach an air supply or electronic controller to the damper device 10 and insert the damper device 10 into a ductwork through, for example, a register boot of the ductwork. FIG. 9 illustrates the folded damper device 10 of FIGS. 4-8 being inserted through a register boot 910 and into a ductwork 920, in accordance with an embodiment of the present invention. Once the damper device 10 is positioned to its proper position within the ductwork, the user may then "release" the damper device 10, thereby "unfolding" the foldable sheet member 140 and the foldable damper blade 160. The foldable sheet member 140 may then grip, fasten, or attach itself to the wall or walls of the ductwork 920, thereby securing the damper device 10 to the ductwork 920 as shown in FIG. 10. FIGS. 1 and 3 clearly show the sheet member 140 in a curved or semi-circular configuration as if conforming to the interior walls of a circular ductwork. In an embodiment of the present invention where a foldable sheet member is not present, the support base 130 may grip, fasten, or attach itself to the wall or walls of the ductwork, thereby securing the damper device 10 to the ductwork. Releasing the "folded" damper blade 160 causes the tensioned hinge member 170 to deploy or unfold the damper blade 160 into an "unfolded" position, as shown in FIGS. 1, 2, and 10.

Once the damper device 10 is positioned in the ductwork and the foldable damper blade 160 "unfolded," the user may then position the foldable damper blade 160 by utilizing the actuator 100. In an embodiment of the present invention wherein the actuator 100 is driven by air pressure, the user may attach an air supply hose to the adapter 180 before inserting the damper device 10 into the ductwork, in order to inject air into the actuator 100 from an air pump. Depending on the amount and/or duration of air added into the actuator 100, the foldable damper blade's 160 position, with respect to the actuator 100, may change between a first position that may allow the most amount of air flow through the ductwork, as shown in FIG. 2, and a second position that may allow the least amount of air flow through the ductwork, as shown in FIG. 1. As air is injected into (or sucked out of) the actuator 100, the internal actuator member 210 begins to move the retractable member 110, thereby pivoting the pivoting member 120 and adjusting the foldable damper blade 160.

In another embodiment of the present invention wherein the actuator 100 is powered by electricity, the user may "plug" the actuator 100 into a power source such as a battery, an electronic controller providing power, or any other power source known to one of ordinary skill in the art capable of providing the appropriate electrical power. Depending on the utilization of a power supplied actuator that may retract and extend the retractable member 110, the foldable damper blade's 160 position, with respect to the actuator 100, may change between a first position that may allow the most amount of air flow through the ductwork, as shown in FIG. 2, and a second position that may allow the least amount of air flow through the ductwork, as shown in FIG. 1. As the actuator 100 sets into motion the internal actuator member 210, the internal actuator member 210 begins to move the retractable member 110, thereby pivoting the pivoting member 120 and adjusting the foldable damper blade 160 within the ductwork.

In summary, a foldably tensioned boot loadable air damper device for controlling the flow of air through ductwork, and a method of installing same are disclosed. The damper device includes an actuator having a retractable member and a pivoting member, wherein the pivoting member is operatively connected to the retractable member of the actuator. The damper device also includes at least one support base supporting the actuator and the pivoting member with respect to each other, a foldable damper blade attached to the pivoting member, and at least one tensioned hinge member operatively connected to the foldable damper blade for unfolding the damper blade. The damper device may be loaded through a register boot and into a ductwork when folded.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. An air damper, comprising:
an actuator;
a pivoting member operatively connected to said actuator;
at least one support base supporting said actuator and said pivoting member with respect to each other;
a foldable damper blade attached to said pivoting member, the foldable damper blade comprising:
a central blade, a first side blade, and a second side blade;
a first hinge mounted to the central blade and the first side blade, wherein the first hinge comprises a first spring to bias the first side blade relative to the central blade and away from the actuator; and
a second hinge mounted to the central blade and the second side blade, wherein the second hinge comprises a second spring to bias the second side blade relative to the central blade and away from the actuator; and
at least one stop mounted to the central blade and extending from the central blade across at least a portion of the first and second side blades, wherein the first and second blades are biasable into contact with the at least one stop to limit rotation of the first and second blades away from the actuator.

2. The air damper of claim 1, further comprising a seal around a periphery of the foldable damper blade.

3. The air damper of claim 1, wherein the foldable damper blade is rotatable relative to the pivoting member between an open position and a closed position by actuating the actuator.

4. The air damper of claim 1, wherein said actuator is an air pressure actuator.

5. The air damper of claim 1, wherein the foldable damper blade includes a first side facing the actuator and a second side that is opposite from the first side, wherein the first and second hinges mounted to the foldable damper blade on the first side, and wherein the at least one stop is mounted to the foldable damper blade on the second side.

6. The air damper of claim 1, further comprising a foldable sheet attached to the support base, wherein the foldable sheet is a sheet of magnetic material.

7. The air damper of claim 1, wherein said actuator is an electro-mechanical actuator.

8. The air damper of claim 7, further comprising a portable power supply couplable to the electro-mechanical actuator.

9. A method for inserting an air damper into a ductwork, the air damper comprising:
an actuator;
a pivoting member operatively connected to said actuator;
at least one support base supporting said actuator and said pivoting member with respect to each other;
a foldable damper blade attached to said pivoting member, the foldable damper blade comprising:
a central blade, a first side blade, and a second side blade;
a first hinge mounted to the central blade and the first side blade, wherein the first hinge comprises a first spring; and
a second hinge mounted to the central blade and the second side blade, wherein the second hinge comprises a second spring; and
at least one stop mounted to the central blade and extending across at least a portion of the first and second side blades;
wherein the method comprises:
manually folding the first side blade and the second side blade relative to the central blade;
inserting the air damper device through a register boot into the ductwork; and
releasing the first and second side blades;
biasing the first side blade relative to the central blade with the first spring;

biasing the second side blade relative to the central blade with the second spring; and stopping rotation of the first and second side blades relative to the central blade with the at least one stop.

10. The method of claim 9, further comprising rotating the foldable damper blade relative to the pivoting member utilizing the actuator.

11. An air damper, comprising:

an actuator;

a pivot operatively coupled to the actuator;

a base supporting the actuator and the pivot, wherein the actuator is operable to rotate the pivot relative to the base;

a damper blade mounted to the pivot, wherein the damper blade comprises:

a central blade, a first side blade, and a second side blade;

a first hinge mounted to the central blade and the first side blade, wherein the first hinge comprises a first spring to bias the first side blade relative to the central blade; and a second hinge mounted to the central blade and the second side blade, wherein the second hinge comprises a second spring to bias the second side blade relative to the central blade; and a stop mounted to the central blade and extending across at least a portion of the first and second side blades, wherein the first and second blades are biasable into contact with the at least one stop to limit rotation of the first and second blades relative to the actuator.

12. The air damper of claim 11, wherein the stop comprises a bar.

13. The air damper of claim 11, wherein the stop and the first and second hinges are mounted on the same side of the damper blade.

14. The air damper of claim 11, further comprising a seal around a periphery of the damper blade.

15. The air damper of claim 11, further comprising a foldable sheet attached to the base, wherein the foldable sheet is a sheet of magnetic material.

16. The air damper of claim 11, wherein said actuator is an air pressure actuator.

17. The air damper of claim 11, wherein the first and second hinges are mounted to a first side of the damper blade and the stop is mounted to a second side of the damper blade opposite the first side of the damper.

18. The air damper of claim 17, wherein the first side of the damper blade faces the actuator.

19. The air damper of claim 11, wherein said actuator is an electro-mechanical actuator.

20. The air damper of claim 19, further comprising a portable power supply couplable to the electro-mechanical actuator.

* * * * *